Patented Aug. 19, 1924.

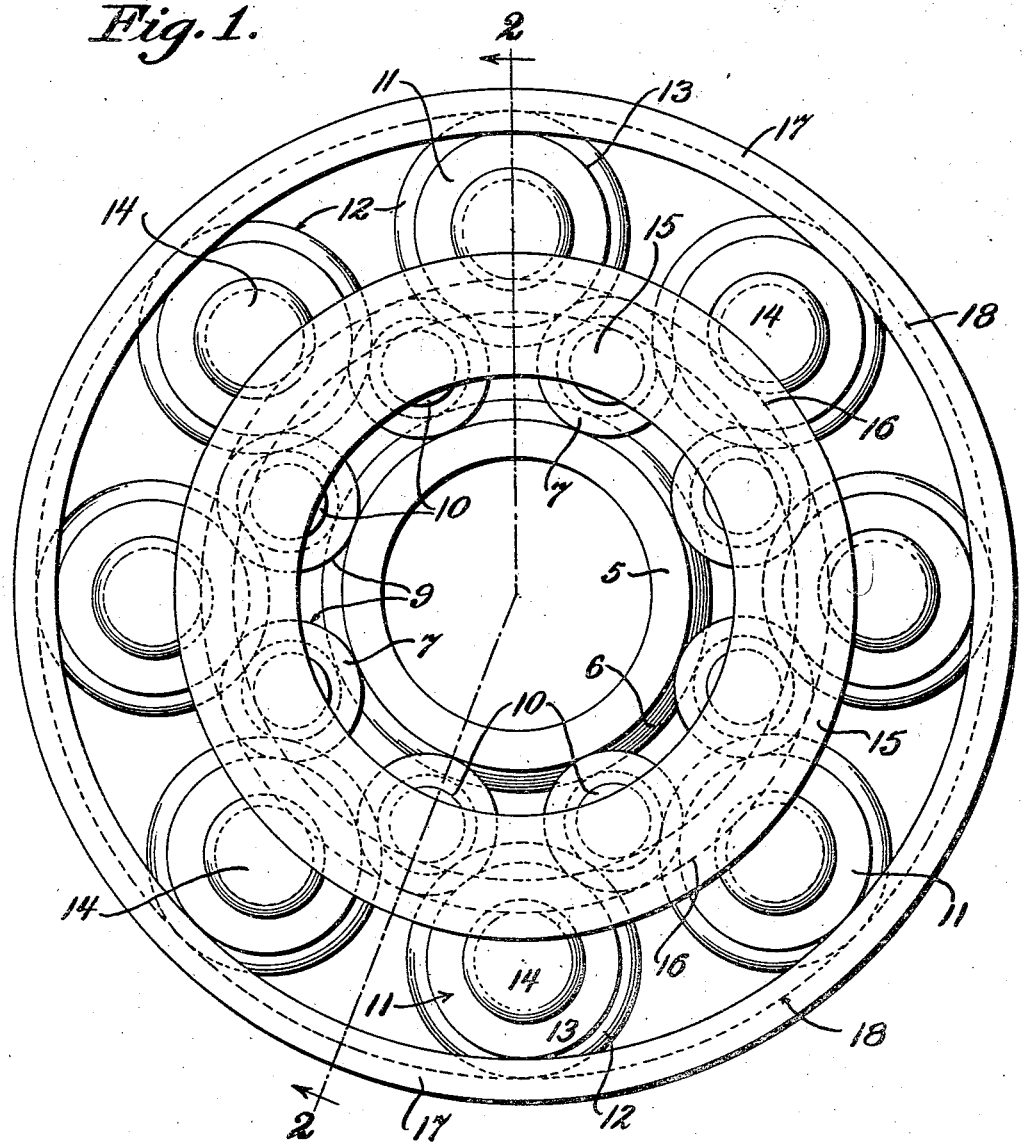

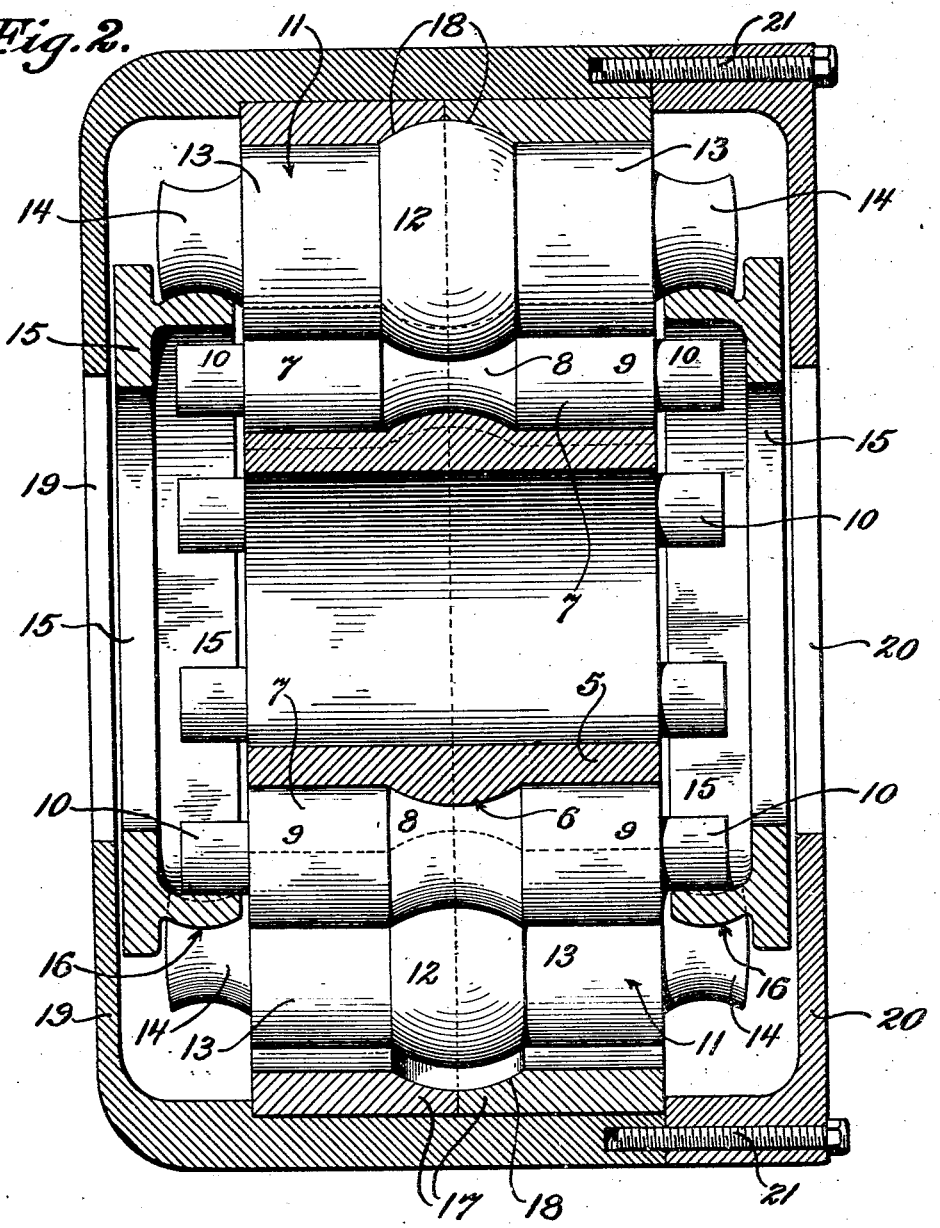

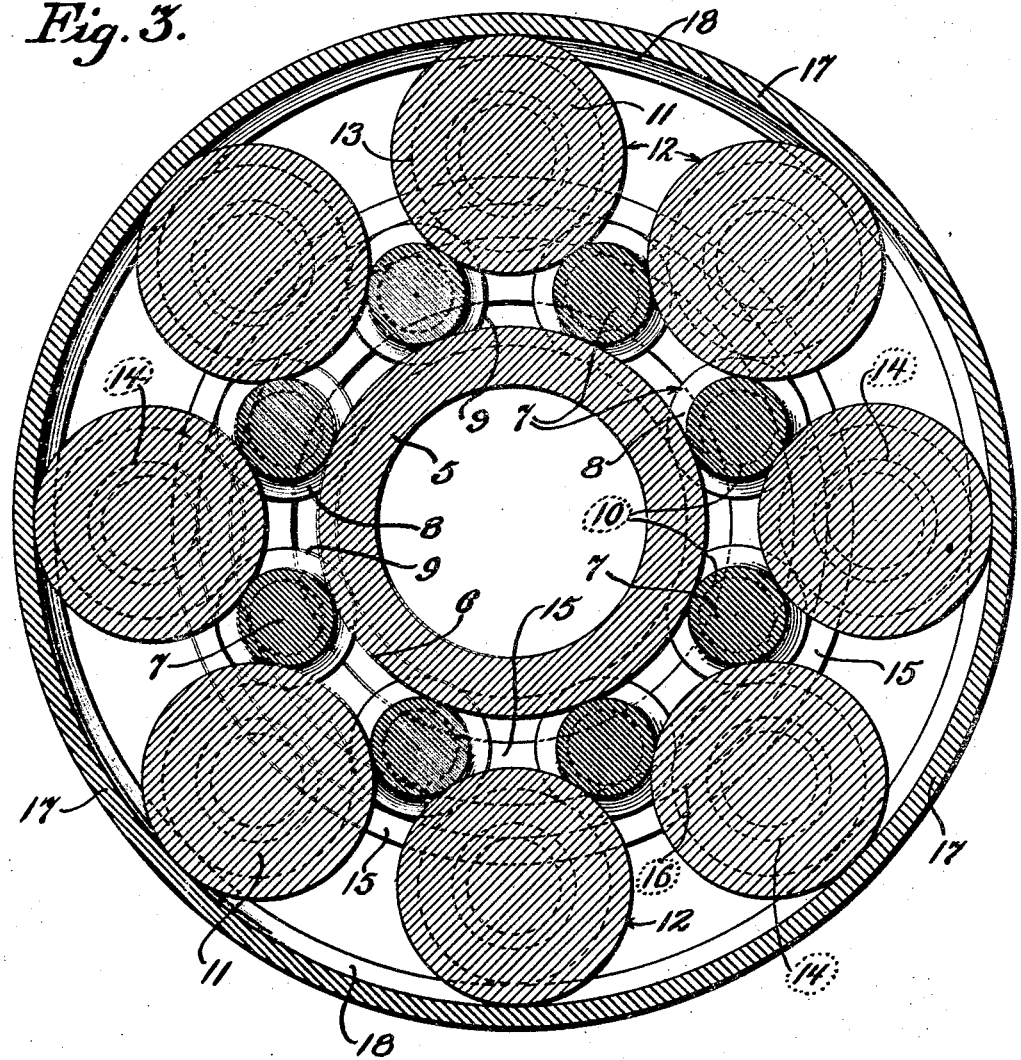

1,505,311

UNITED STATES PATENT OFFICE.

PATRICK H. CALLAGHAN, OF PHILADELPHIA, PENNSYLVANIA.

BEARING.

Application filed October 30, 1922. Serial No. 597,736.

*To all whom it may concern:*

Be it known that I, PATRICK H. CALLAGHAN, a citizen of the United States, residing at Philadelphia, in the county of Philadelphia and State of Pennsylvania, have invented certain new and useful Improvements in Bearings, of which the following is a specification.

My invention relates to anti-friction bearings of the type in which the rollers are arranged in circular series.

The object of the invention is to provide an improved, novel and simple construction of roller bearing in which the rollers are so placed as to reduce friction to a minimum, and so assembled as to prevent binding or angular displacement.

This object, and other advantageous ends which will be described hereinafter, I attain in the following manner, reference being had to the accompanying drawings in which—

Figure 1 is an end elevation of my improved roller bearing,

Figure 2 is a sectional view taken on the line 2—2 of Figure 1, and

Figure 3 is a central sectional view taken through Figure 2.

In the drawings, 5 is a sleeve adapted to be secured upon a shaft or other supporting element and provided midway between its ends with an annular peripheral rib 6, preferably of convex cross section. A series of rollers 7 is disposed about the sleeve, each having, midway of its ends, an annular groove 8, conforming in contour to rib 6, cylindrical parts 9 adapted to engage with the cylindrical parts of the sleeve, and reduced cylindrical ends 10 which serve as trunnions. Another series of rollers 11 preferably of larger diameter is disposed around rollers 7, each having midway of its ends a rib 12 conforming in contour with the grooves in rollers 7, cylindrical parts 13 adapted to engage with the cylindrical parts of rollers 7, and reduced concave ends or trunnions 14. Spacing rings 15, have flush inner faces, which encircle the trunnions 10 of rollers 7 and convex outer faces 16 which engage the concave trunnions 14 of rollers 11. A sectional ring 17 encircles the outer series of rollers and is provided, in its inner wall, with a groove 18 conforming in contour to rib 12 on the outer series of rollers, one half of the groove being in each section of the ring. The sections of the ring may be held in place by an annular casing consisting of two parts 19 and 20 which may be connected by screws 21. The retaining rings 15 hold the trunnions of the two series of rollers in a fixed relation to each other and prevent binding engagement of the rollers.

In use, assuming that sleeve 5 is fixed to a shaft or other rotating element, it will when rotated, cause rollers 7 to roll thereon and this rotation will be imparted to rollers 11, the rollers all moving in the same direction at the points of contact, but the inner rollers rotating in opposite direction from the outer rollers, and the outer rollers rolling on the inner face of ring 18. The trunnions of rollers 7 and 11 also roll on rings 15 in opposite directions. Assuming that sleeve 5 is stationary and ring 18 turns, the same effect is produced.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. An anti-friction bearing comprising a sleeve; an annular series of rollers engaging with the sleeve, the rollers having cylindrical trunnions; an annular series of rollers engaging with the rollers of the first series, the rollers having concave trunnions; spacing rings having a flush inner face adapted to engage the trunnions of the inner series of rollers, and a convex outer face adapted to engage the trunnions of the outer series of rollers, and means for holding the sleeve and rollers in engagement.

2. An anti-friction bearing comprising a sleeve having an annular rib; an annular series of rollers having annular grooves engaging with the rib on the sleeve; an annular series of rollers having ribs engaging with the grooves on the rollers of the first series; a sectional ring for holding the sleeve and rollers in engagement with each other and provided with an annular groove engaging the ribs of the rollers on the second series, the ring being sectioned circumferentially through its groove, and means for securing the sections of the ring to each other.

3. An anti-friction bearing comprising a sleeve; an annular series of rollers engaging with the sleeve, the rollers having cylindrical trunnions; an annular series of rollers engaging with the rollers of the first series, the rollers having concave trunnions; spacing rings having a flush inner face adapted to engage the trunnions of the inner series of rollers, and a convex outer face adapted to engage the trunnions of the outer series of rollers; a split ring adapted to hold the sleeve and rollers in engagement, and means for securing the parts of the split ring to each other.

4. An anti-friction bearing comprising a sleeve; an annular series of rollers engaging with the sleeve; an annular series of rollers engaging with the rollers of the first series, the sleeve and rollers being provided with intermeshing ribs and recesses, the rollers of the inner series having cylindrical trunnions and those of the outer series having concave trunnions; spacing rings having a flush inner face adapted to engage the trunnions of the inner series of rollers, and a convex face adapted to engage the trunnions of the outer series of rollers, and means for holding the sleeve and rollers in engagement.

In testimony whereof I have signed my name to this specification in the presence of two subscribing witnesses.

PATRICK H. CALLAGHAN.

Witnesses:
CHAS. E. POTTS,
ELIZABETH GARBE.